UNITED STATES PATENT OFFICE.

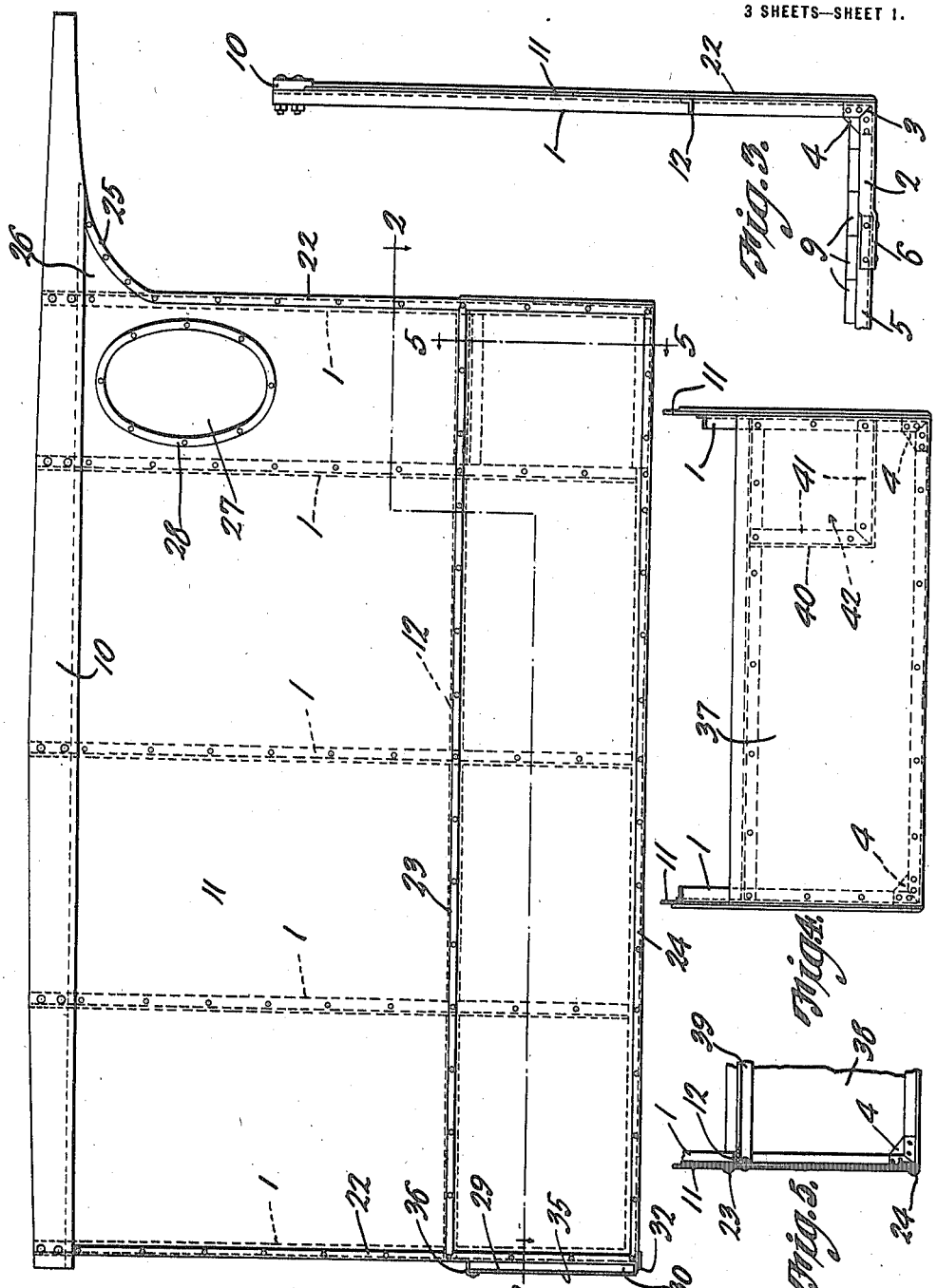

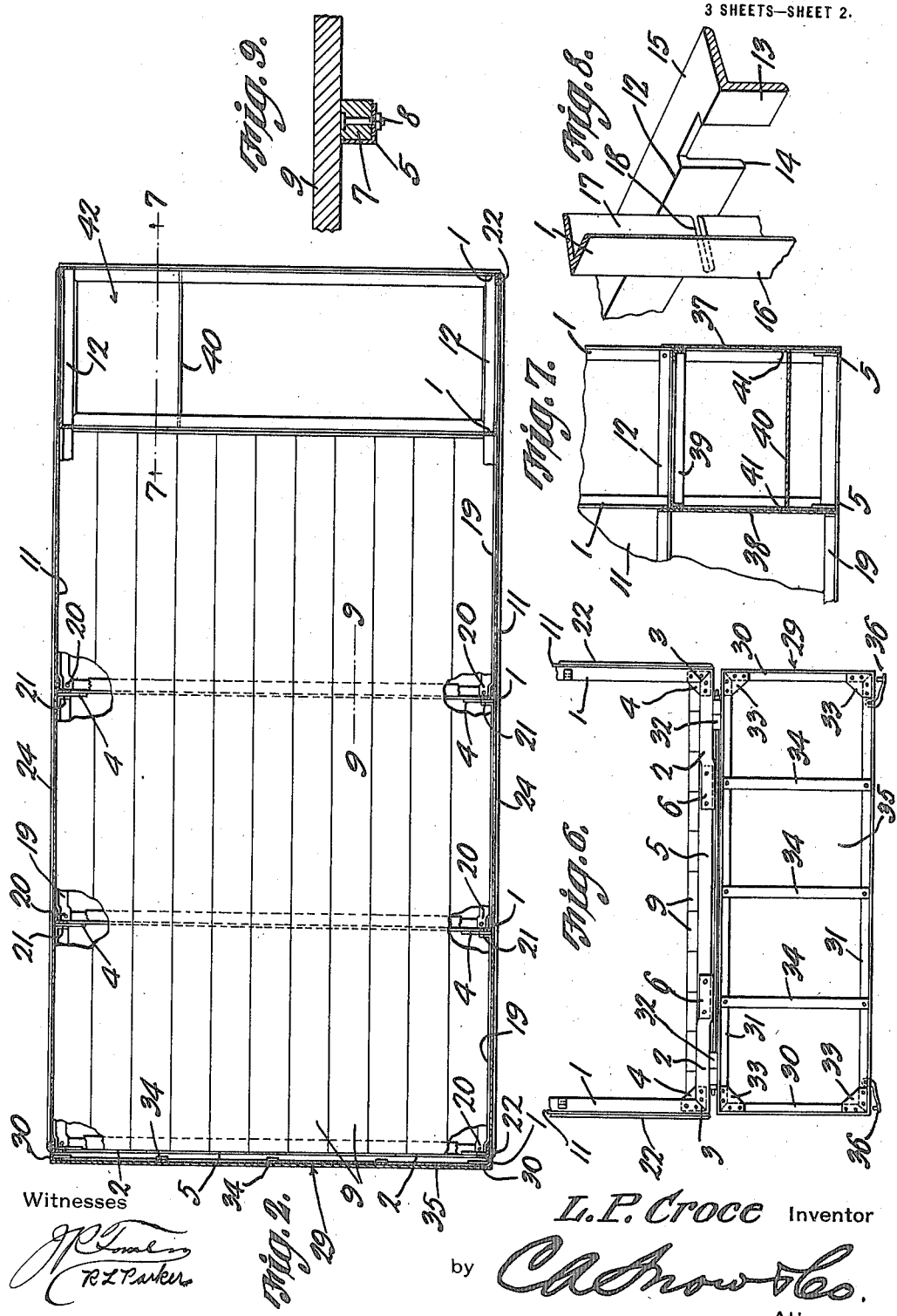

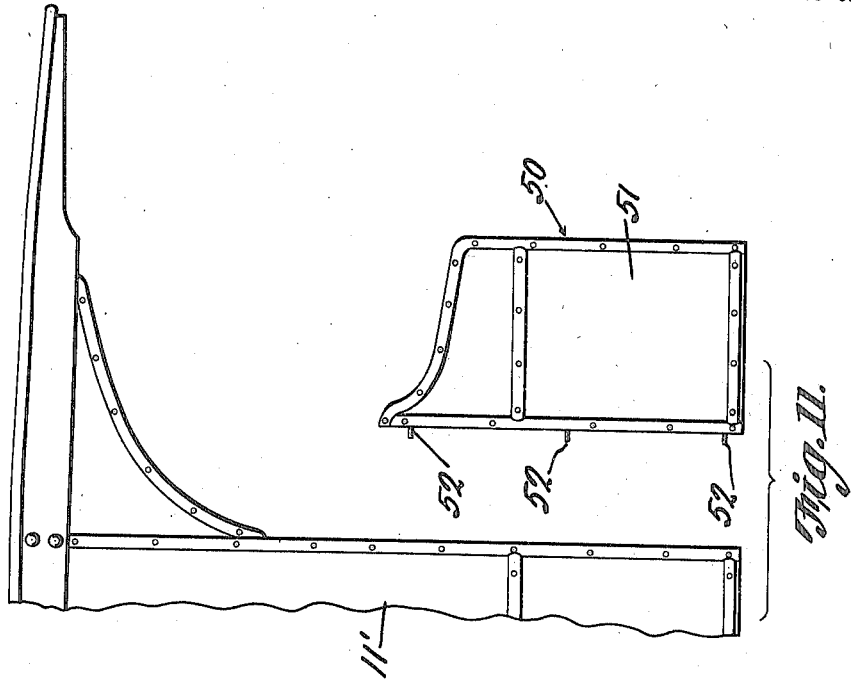
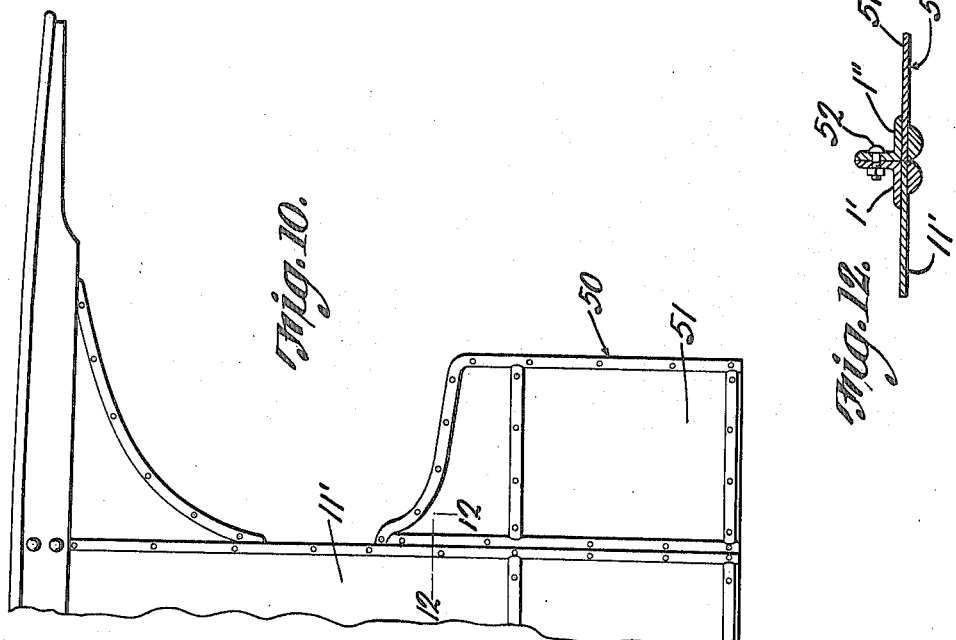

LOUIS P. CROCE, OF ASBURY PARK, NEW JERSEY.

STEEL VEHICLE-BODY.

1,233,319.

Specification of Letters Patent.  Patented July 17, 1917.

Application filed May 24, 1916. Serial No. 99,631.

*To all whom it may concern:*

Be it known that I, LOUIS P. CROCE, a citizen of the United States, residing at Asbury Park, in the county of Monmouth and State of New Jersey, have invented a new and useful Steel Vehicle-Body, of which the following is a specification.

The present invention appertains to vehicle bodies and frames, and aims to provide a vehicle body adapted especially for delivery automobiles, which body is constructed chiefly of metal, and the parts being so assembled that the structure will be thoroughly rigid.

It is the object of the invention to provide novel means for assembling various parts of the body or frame, whereby to enhance the efficiency of the structure, and to render the structure substantial to eliminate the loosening or rattling of the parts.

It is also the object of the invention to provide a vehicle body which can be transported in a compact condition, to reduce the freight or transportation charges, and the sections being readily assembled when received at their destination.

It is also within the scope of the invention to provide a structure of the character indicated which is comparatively simple and inexpensive, as well as being thoroughly efficacious in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a side elevation of the improved body.

Fig. 2 is a horizontal section thereof taken on the line 2—2 of Fig. 1.

Fig. 3 is a fragmental end view, looking from the rear, and the rear end gate being removed.

Fig. 4 is a fragmental forward end view.

Fig. 5 is a sectional detail taken on the line 5—5 of Fig. 1.

Fig. 6 is a fragmental rear end view showing the end gate swung downwardly.

Fig. 7 is a sectional view taken on the line 7—7 of Fig. 2.

Fig. 8 is a perspective view showing one of the uprights and the respective longitudinal side rail separated, to illustrate the interengaging portions thereof.

Fig. 9 is an enlarged sectional detail taken on the line 9—9 of Fig. 2.

Fig. 10 is a side elevation of the forward end of a modified form.

Fig. 11 is a similar view showing the body and seat detached.

Fig. 12 is an enlarged sectional detail taken on the line 12—12 of Fig. 10.

In carrying out the invention, there is provided at opposite sides of the structure longitudinally spaced uprights 1 formed of angle iron and having certain flanges lying in the plane of the sides of the body, and the other flanges projecting inwardly. The lower terminals of the uprights 1 are bent angularly inward, as at 2; the inwardly projecting flanges of the uprights being split, as at 3, at the bends and having riveted thereto at the opposite sides of the splits, gusset plates 4, which serve to reinforce the bends between the uprights 1 and the lower inwardly projecting extensions or terminals 2 thereof. The extensions 2 are connected by cross pieces 5 of angle iron, which are spliced and secured by rivets or otherwise, as at 6, to the extensions 2, whereby when the cross pieces 5 are detached, the two sides of the structure can be packed within a small compass with the other parts for transportation, although in some cases, the cross pieces 5 can be integral with the extensions 2 or lower terminals of the standards.

Fitted within the cross pieces 5 and extensions 2 are bars or cleats 7 of wood or equivalent material, which are secured by bolts 8 or otherwise to the cross pieces 5 and extensions 2, preferably to the lower flanges thereof, the other flanges projecting upwardly. The longitudinal floor boards 9 can be secured upon the cleats 7 to provide the floor or bottom of the body.

Riveted or otherwise secured to the upper terminals of the uprights 1 against the outwardly facing flanges, is a pair of upper longitudinal side bars 10, constructed of wood or other suitable material, and projecting forwardly from the forward uprights 1 to provide the peak of the top of the body. Sheet metal side plates 11 are also riveted or otherwise secured to said outwardly facing flanges of the uprights 1 to provide the side walls of the body, the upper edges of the plates 11 extending slightly behind the lower edges of the bars 10.

Secured to the uprights between their upper and lower ends are longitudinal side rails 12, formed of angle iron, and said rails are assembled with the uprights 1 in a peculiar manner, as best depicted in Fig. 8. Thus, each rail 12 has its downwardly projecting flange 13 provided with a recess 14, which extends partially into the other inwardly projecting flange 15, for snugly receiving the outwardly facing flange 16 of the respective upright 1, whereby the flanges 13 and 16 will be flush, in order that the plate 11 can rest snugly against the rails 12 as well as the uprights 1. The inwardly projecting flange 17 of the upright 1 has an open slot 18 for snugly receiving the flange 15 of the rail, whereby the rail and upright can be assembled by the transverse movement thereof relative to one another. The plates 11 are riveted or otherwise secured to the flanges 13 of the rails 12.

The lower ends of the uprights 1 are connected by longitudinal alining angle members 19 which have certain ends offset, as at 20, to fit within the bends between the uprights 1 and their extensions 2, while the other ends of the members 19 are provided with angular portions 21. The portions 21 are riveted or otherwise secured to the respective gusset plates 4 and uprights, while the offset ends 20 are riveted or otherwise secured in place. The lower edges of the plates 11 are riveted or otherwise secured to the upwardly projecting flanges of the members 19, which have their other flanges projecting inwardly.

Binding strips 22 are placed against the ends of the plates 11 and are fastened to the end uprights by the same rivets which attach the plates 11 thereto, and longitudinal strips 23 and 24 are placed against the outer surfaces of the plates 11 along the rails 12 and members 19, respectively, being engaged by the rivets which clamp the plates 11 against said rails and members. The strips 22, 23 and 24 serve to better hold the plates 11 in place, to avoid said plates tearing loose from the rivets. The upper terminals of the front strips 22 are curved forwardly, as as 25, to finish the peak, and the upper forward corners of the plates 11 have extensions 26 above the terminals 25 to close the sides of the peak.

The plates 11 are provided with windows 27 at the sides of the seat at the forward end of the body, and the edges of the plates 11 are reinforced by strips or window frames 28 riveted or otherwise secured to the plates around the windows or openings 27.

The rear end gate 29 is composed of end members 30 and longitudinal members 31 all formed of angle iron and having their ends secured together at the corners by means of gusset plates 33. Strips 34 are secured to the members 31 at spaced points between the members 30, and a plate 35 is secured by means of rivets or otherwise to the members 30 and 31 and strips 34. One of the members 31 is connected by hinges 32, to the extensions 2 of the rear uprights, whereby the end gate can be swung upwardly and downwardly. The other member 31 carries catches 36 for holding the end gate in closed position when raised. These catches may be of any suitable nature.

The peak structure of the body embodies a vertical plate 37 riveted or otherwise secured to the front uprights 1 and front cross piece 5, and a similar plate 38 similarly secured to the second uprights 1 and cross piece, said plates 37 and 38 extending from the cross pieces to the rails 12, and an angle iron seat frame 39 is secured to the first and second uprights at either side and to the plates 37 and 38. The seat or seat cushion can be placed upon the frame 9 between the upper projecting edges of the plates 37 and 38.

An angular plate 40 has flanges 41 riveted or otherwise secured to the plates 37 and 38 adjacent one side plate 11, and provides a cavity or pocket 42 for holding the gasolene or fuel tank.

In view of the construction and assemblage of the various parts, the desired objects are carried out in a satisfactory manner, the advantages of the structure being evident from the foregoing taken in connection with the drawings.

In the modified form shown in Figs. 10, 11 and 12, the body and seat are separate units, and in the main are of the same construction as the united body and seat above described. The body embodies upright angle iron standards or uprights 1' to which the side plates 11' are secured. The seat 50 has the sheet metal sides 51, and is provided at the rear edges of said side plates 51 with upright angle irons 1''. The angle irons 1'' are fastened by bolts 52 or other suitable securing means to the forward uprights 1' of the body, whereby to detachably connect the body and seat, as seen in Fig. 10. By this arrangement, the automobile chassis can be built complete with the seat 50 attached thereto, and the gasolene tank applied to the seat which is provided with the pocket or cavity 42 hereinbefore described, and various styles of bodies can be applied to the chassis and seat. One seat construction will suffice for various styles of bodies, whereby the seat can be assembled with the chassis at the time that the chassis is constructed or assembled. Then, when an order is received for a delivery automobile with a certain style body, the body can be readily attached to the chassis and seat, thus saving time and trouble. Furthermore, in case that repairs are necessary, the body and seat can be removed independently of one another, it being especially desirable that the body can be removed with the seat left in place so as not to disturb the gasolene tank and connections therewith.

Having thus described the invention, what is claimed as new is:

1. A vehicle body embodying upright side members having inwardly projecting extensions at their lower ends, cross pieces disposed between and in alinement with said extensions, and cleats fitting said cross pieces and extensions to splice them together and adapted for the attachment of flooring boards thereon.

2. A vehicle body embodying angle iron uprights having inwardly projecting extensions at their lower ends, angle iron cross pieces spliced with said extensions, cleats secured within said cross pieces and extensions, and longitudinal floor boards resting upon said cleats.

3. A vehicle body embodying an angle iron upright and rail crossing one another, the rail and upright each having an outwardly facing flange, said flanges being flush and one of them having a recess receiving the other outwardly facing flange, the rail and upright each having another flange, one of the last mentioned flanges having an open slot receiving the other last mentioned flange, and a side plate secured to said outwardly facing flanges.

4. A vehicle body embodying angle iron uprights having outwardly facing and inwardly projecting flanges, a longitudinal rail having an outwardly facing and an inwardly projecting flange, the outwardly facing flange of the rail having a recess for each upright receiving the outwardly facing flange thereof, the inwardly projecting flange of each upright having an open slot receiving the inwardly projecting flange of the rail, and a side plate secured to the outwardly facing flanges.

5. A vehicle body embodying side uprights, cross pieces connecting the lower ends thereof, vertical plates secured to the uprights and cross pieces, a seat frame secured to the uprights and plates, said plates projecting above said frame.

In testimony that I claim the foregoing as my own, I have hereto affixed my signature in the presence of a witness.

LOUIS P. CROCE.

Witness:
MARTIN L. FERRIS.